United States Patent
Mayni et al.

(10) Patent No.: US 8,720,508 B2
(45) Date of Patent: May 13, 2014

(54) TREAD HAVING A GRADIENT OF PROPERTIES FOR IMPROVING IRREGULAR WEAR

(75) Inventors: Paul Andrew Mayni, Greenville, SC (US); David Pressley, Taylors, SC (US); Benoit Marie Foucher, Chamalieres (FR)

(73) Assignees: Michelin Recherche et Technique S.A., Granges-Paccot (CH); Societe de Technologie Michelin, Clermont-Ferrand (FR)

( * ) Notice: Subject to any disclaimer, the term of this patent is extended or adjusted under 35 U.S.C. 154(b) by 548 days.

(21) Appl. No.: 13/050,463

(22) Filed: Mar. 17, 2011

(65) Prior Publication Data

US 2012/0234442 A1    Sep. 20, 2012

(51) Int. Cl.
  *B60C 11/00*    (2006.01)
  *B60C 1/00*    (2006.01)
(52) U.S. Cl.
  USPC ...................................... 152/209.5; 152/905

(58) Field of Classification Search
  CPC .............. B60C 11/005; B60C 11/0008; B60C 11/0041; B60C 2011/0025; B60C 2011/0033; B60C 2011/0008; B60C 2011/0016; B60C 1/00
  USPC .............. 152/209.1, 209.3, 209.5, 209.8, 905
  See application file for complete search history.

(56) References Cited

U.S. PATENT DOCUMENTS

| 6,247,512 B1 | 6/2001 | Radulescu | |
| 2012/0132332 A1* | 5/2012 | Zhao et al. | 152/209.5 |

FOREIGN PATENT DOCUMENTS

| JP | 08-142611 A | 6/1996 |
| JP | 2009-107435 A | 5/2009 |

* cited by examiner

*Primary Examiner* — Eric Hug
(74) *Attorney, Agent, or Firm* — E. Martin Remick

(57) ABSTRACT

This invention relates generally to treads having a configuration and/or properties for improving or preventing irregular wear on the tread of a tire, and, more specifically, to a tire that has a tread with a gradient of properties that helps to prevent or improve irregular wear, especially suitable for tires that are free rolling such as steer or trailer tires used on trucks.

15 Claims, 6 Drawing Sheets

US 8,720,508 B2

TREAD HAVING A GRADIENT OF PROPERTIES FOR IMPROVING IRREGULAR WEAR

BACKGROUND OF THE INVENTION

1. Field of the Invention

This invention relates generally to treads having a configuration and/or properties for improving or preventing irregular wear on the tread of a tire, and, more specifically, to a tire that has a tread with a gradient of properties that helps to prevent or improve irregular wear, especially suitable for tires that are free rolling such as steer or trailer tires used on trucks.

2. Description of the Related Art

The appearance of abnormal wear is a frequent cause for removing tires, especially truck tires used as steer or trailer tires, because they are not driven and are therefore prone to develop abnormal wear, especially in the shoulder of the tires. There are many attempted solutions to this problem that involve the use of different tread materials that attempt to prevent or improve the abnormal wear characteristics of the tire.

While it is known that x, y and z stresses placed on tread elements play a role in the development of irregular wear, the modification of x-stresses is often focused on in order to improve the irregular wear performance of a tire. One example of this is U.S. Pat. No. 6,247,512. It discloses several combinations of tread compounds that have different modulus and hysteresis that alternate in the tread. This patent, as shown by FIG. 1, theorizes that hysteretic compounds improve abnormal wear performance by changing the x-stresses or circumferential stresses of tread elements, such as ribs or blocks. By using different materials with different properties, the negative kick-out stresses 20 are ameliorated or even changed to positive stresses 22, helping to prevent irregular wear. However, there is no unified approach or theory given by this patent for designing a tread for maximizing this benefit. For example, there are multiple embodiments that switch a first tread material having greater hysteresis and lower modulus with a second material having lower hysteresis and higher modulus so that one is on top of the other in one embodiment while the other is on top in yet a further embodiment. Accordingly, the reason why these various configurations work is not fully developed and a further refinement or improvement is warranted.

Accordingly, it is desirable to find a unified theory and design approach that optimizes the use of tread compounds having different properties to minimize the appearance of abnormal wear in a tire so that tires with treads having even better wear performances can be obtained that also have desirable rolling resistance and heat generation characteristics as well.

SUMMARY OF THE INVENTION

In one embodiment, the present invention includes a tire having a tread with tread elements, said tread having at least one element having a gradient of properties so that a system hysteresis of that tread element decreases as the tread element wears and a system rigidity of the tread element stays the same or decreases as the tread element wears.

In such a case, all the tread elements may have a gradient of properties so that an system hysteresis of each element decreases as tread element wears and an effective rigidity of each tread element stays the same or decreases as the tread element wears.

In some embodiments, the elements of the tread are ribs.

In other embodiments, the gradient of properties includes an system hysteresis that is calculated using the formula $H_{system} = (V_{km1}/V_{total})(H_{km1}) + (V_{km2}/V_{tot})(H_{km2})$ as the tread wears where km2 is the material that comprises the top layer and km1 is the material that comprises the bottom layer.

In some cases, the gradient is continuous and the $H_{system}$ is calculated as an integral over the depth of the tread element.

In yet further embodiments, the system rigidity of the tread element is a function of the geometric rigidity of the tread element and the modulus of one or more materials used in the tread element. In some cases, the tread element has two materials and the modulus of the two materials is substantially the same.

In such a case, the first material is used in the bottom layer of the tread element and has a modulus of 4.6 to 4.75 MPa and the second material is used in the top layer of the tread element and has a modulus of 4.9 MPa. The hysteresis of the first material may have a tan delta max value at 80 C of 0.08 to 0.01 and the hysteresis of the second material may have a tan delta max value at 80 C of 0.18.

In some embodiments, the top layer of the tread element comprises ⅓ to ½ of the thickness of the tread or wearable life of the tread.

In other embodiments, a single layer of material makes up the tread element that has a continuously varying modulus.

In yet another embodiment, the present invention includes a tire having a tread with tread elements, said tread having at least one element having a gradient of properties so that a system hysteresis of that tread element decreases as the tread element wears and the modulus of the one or more materials that comprise the tread element stays essentially the same. In cases wherein two materials comprise the tread element, the difference of the modulus of one material to the other may be less than 20%. Likewise, the hysteresis of the first material that comprises the lower layer of the tread element may have a tan delta max value at 80 C of 0.08 to 0.1 and the hysteresis of the second material that comprises the upper layer of the tread element may have a tan delta max value at 80 C of 0.18. Also, the modulus of the first material may be 4.6 to 4.75 MPa and the modulus of the second material may be 4.9 MPa. Finally, the top layer of the tread element may comprise ⅓ to ½ of the thickness of the tread element or wearable life of the tread element. In some embodiments, the geometric rigidity of the tread element remains substantially the same as the tread element wears. This stability of the geometric rigidity may be achieved by using sipes and voids such as the constructions described below in the Detailed Description of Particular Embodiments section of the present patent application.

The foregoing and other objects, features and advantages of the invention will be apparent from the following more detailed descriptions of particular embodiments of the invention, as illustrated in the accompanying drawing wherein like reference numbers represent like parts of the invention.

DETAILED DESCRIPTION OF PARTICULAR EMBODIMENTS

Figure 1:
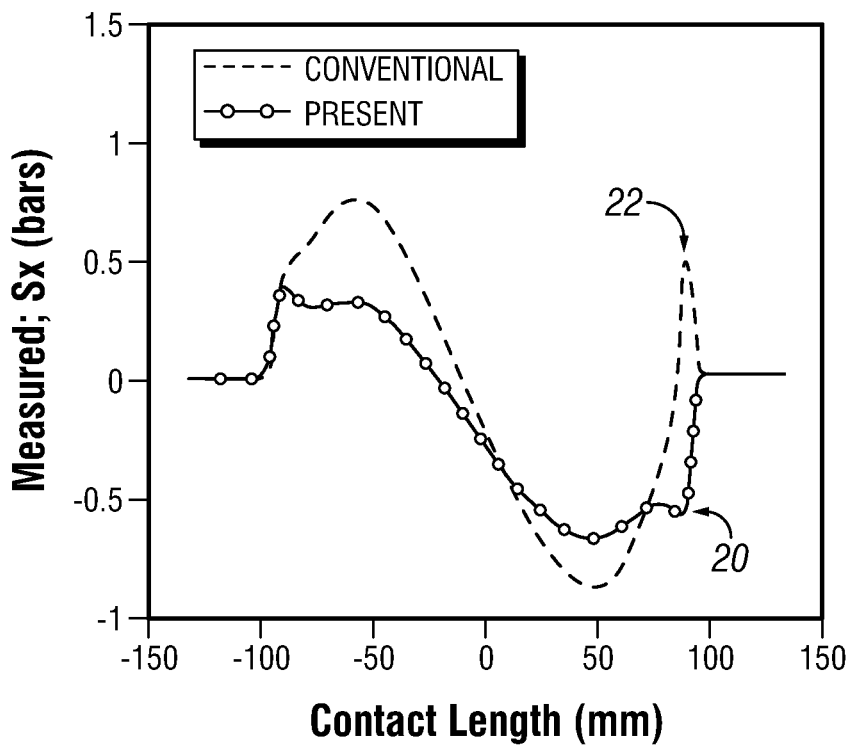
FIG. 1 is a graph showing the change of negative kick-out stresses 20 to positive kick-out stresses 22 according to a previous design that has been used to ameliorate abnormal wear.
Figure 2:
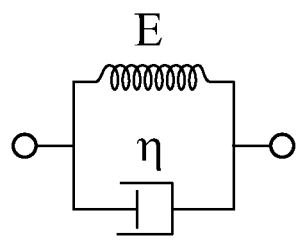
FIG. 2 is a schematic depicting the Kelvin-Voight model which is a linear viscoelastic model that comprises a Newtonian damper Ti and a Hookean elastic spring E that are connected in parallel.

Looking at FIG. 2, a Kelvin-Voigt model is shown that is an analytical representation of a linear viscoelastic model that can be used to predict and analyze the behavior of a material used in a tread of a tire. This model consists of a Newtonian damper η and Hookean elastic spring E connected in parallel as shown. The damper is used to approximate the viscous properties of the material while the spring is used to approximate the flexibility or modulus of the material. The inventor chose this model as a basis for developing a theory to explain why materials having different hysteresis and modulus that are arranged in different configurations in the tread of a tire can improve the abnormal wear characteristics of the tire.

Figure 3:
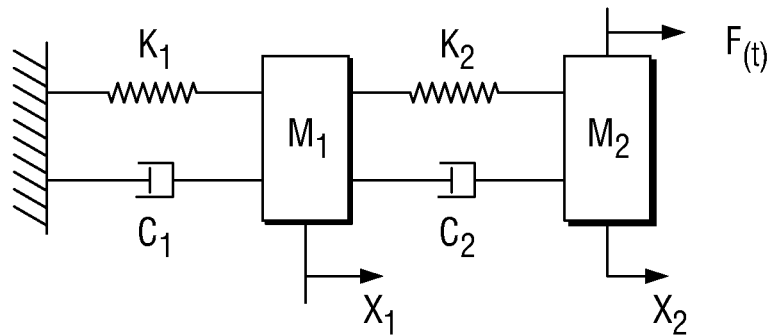
FIG. 3 is a schematic modeling a tread having two materials using the Kelvin-Voigt model of FIG. 2.

Turning to FIG. 3, this model has been adapted to represent the behavior of two different materials that are used in the tread of a tire, one on top of the other. Thus, the two materials with different springs and dampers are connected in series. As shown, $K_1$ and $K_2$ are the stiffness or modulus of the first and second materials, respectively, while $C_1$ and $C_2$ are the viscous damping coefficients. $M_1$ and $M_2$ account for the mass of each material and F(t) is the forcing function, where F is the force and t is the time at which the force causes the materials to displace a certain amount. Thus, $x_1$ is the amount the first material displaces while $x_2$ is the amount the second material displaces due to the force applied to the system. In practice, the forcing function represents the imposed displacement that the tread experiences as it rolls into and out of the contact patch, which is the area where the tread meets the road.

The equation for analyzing the behavior of this system is given by the following differential equation:

$$[M](dx/dt)^2 + [C]dx/dt + [K]x = F_0 e^{j\omega t} \quad \text{Eq. 1,}$$

where the variables have the values described above for the Kelvin-Voigt model. This differential equation (Eq. 1) has a known solution which is the following equation:

$$x(t) = X e^{j\omega t} \quad \text{Eq. 2.}$$

Substituting Eq. 2 into Eq. 1 yields a third equation:

$$[-M\omega^2 + K + j\omega C]X = F_0 \quad \text{Eq. 3.}$$

This equation reduces to a fourth equation:

$$[-M\omega^2 + K^*] = F_0 \quad \text{Eq. 4,}$$

where $K^* = K(1 - \eta j)$ \quad Eq. 5 and $\eta = \omega C/K$ \quad Eq. 6.

Eq. 5 represents the complex stiffness of the system while Eq. 6 represents the loss factor of the system, which corresponds to the energy dissipation in the system.

For a steady state solicitation of the forcing function, $F_o$, Eq. 4 is a valid equation of motion. As mentioned above, the forcing function represents the deflection imposed on the tread as it enters and exits the contact patch. Therefore, it varies in accordance with the speed of the vehicle upon which the tire is mounted. One can imagine this model can be applied to the X (or circumferential direction, i.e. the direction the tire rolls), Y (or lateral direction, i.e. across the width of the tread perpendicular to the circumferential direction), and Z (or radial direction) displacements of the tread of the tire. In many instances, the tread is divided into tread elements that are defined by grooves in the tire for the absorption of water or snow to improve the traction of the tire in such weather conditions. Typical tread elements include ribs when only circumferential grooves are provided and tread blocks when additional grooves are added that are oblique to the circumferential grooves. When tread elements are present, each tread element may have its own X, Y and Z displacements.

Figure 4A:
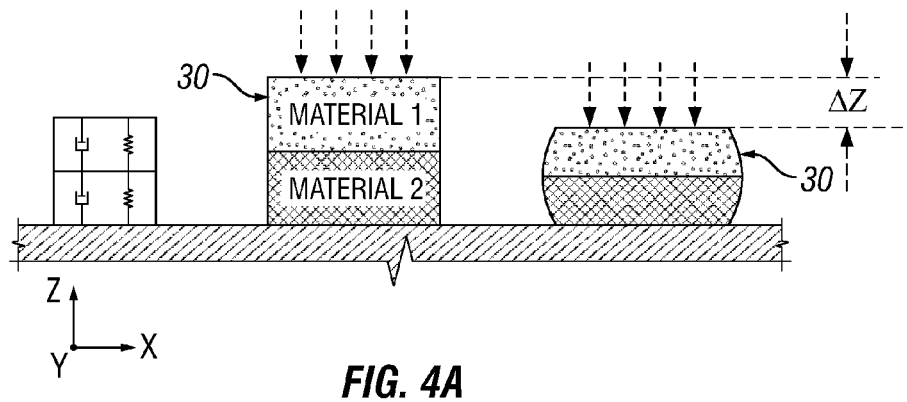
FIGS. 4A thru 4C show the different modes of displacement for a tread element such as the Z displacement in compression, X displacement in shear, and the Y displacement in shear, respectively as a tread element rolls into contact with a road surface.
Figure 4B:
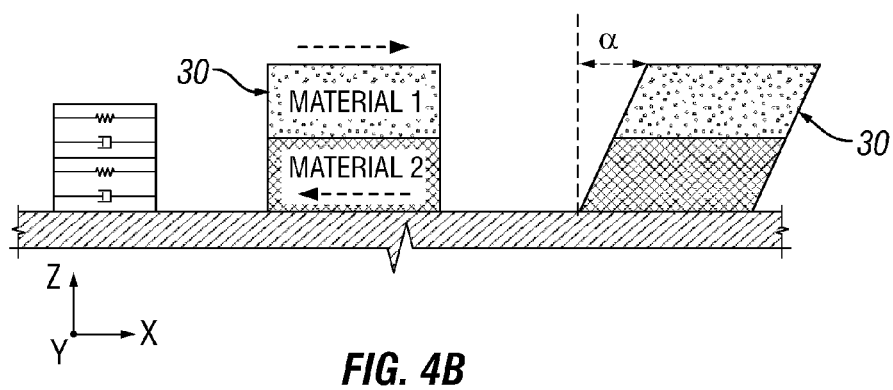
Figure 4C:
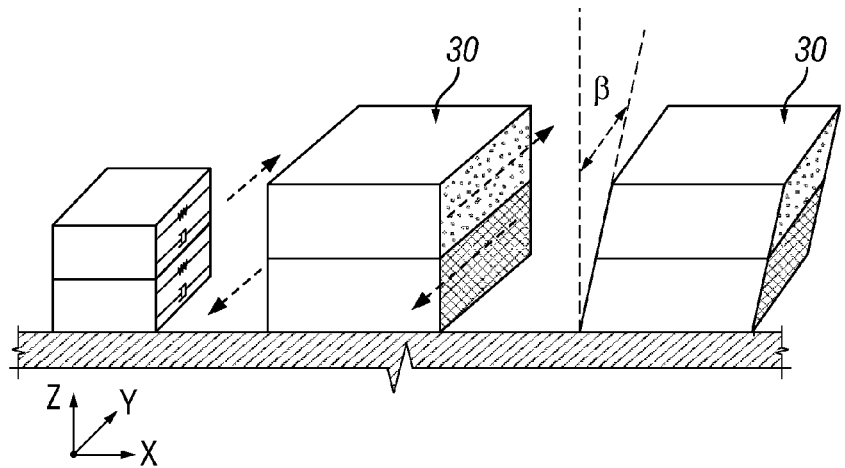

These three different types of displacement are shown in FIGS. 4A thru 4C. FIG. 4A shows the radial or Z displacement, represented by AZ in the figure, as a compression that usually occurs as the tread element 30 rolls into the contact patch. This causes the tread element 30 to decrease in height in the Z direction and bulge in the X or Y directions. In such a case, the Kelvin-Voigt model shows the springs and dampers connected in series. FIG. 4B shows the circumferential or X displacement as a shear displacement that causes the tread element 30 to lean in the X direction causing it to form an angle α with Z direction. Finally, FIG. 4C shows the lateral or Y displacement as a shear displacement that causes the tread element 30 to lean in the Y direction causing it form an angle 13 with the Z direction. For both the X and Y displacements, the Kelvin-Voigt model shows the springs and dampers connected in parallel.

The behaviors most influencing wear and abnormal wear are found in the X and Y directions as a result of the shear solicitation. The hypothesis is that there exists an optimum shear rigidity and hysteresis that protects against abnormal wear. For the optimization of resistance to abnormal wear, it is best to have a material with as high a hysteresis as possible. Unfortunately, this leads to a tire having very high rolling resistance, which can deleteriously affect the fuel mileage of a vehicle using the tire. Similarly, the tread of the tire will have the tendency to produce a great amount of heat which can lead to increased temperatures in the tread that can lead to degradation of the tread. Both of these effects are undesirable. Therefore, an optimization of these tradeoffs is needed.

Figure 5:
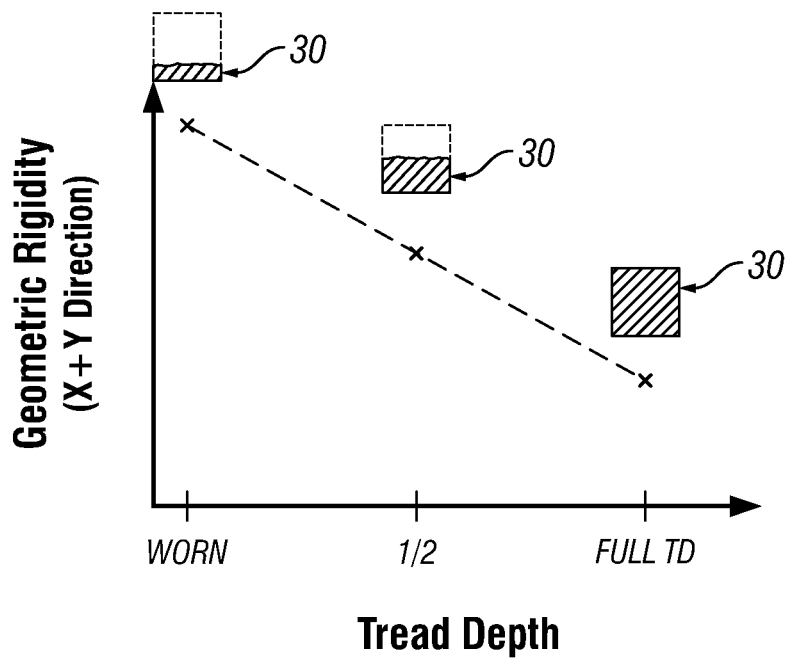
FIG. 5 is a graph comparing the geometric rigidity of a tread element in the X and Y plane versus tread depth.

Looking now at FIG. 5, it is shown that as the tread element 30 wears, its geometric rigidity increases provided that its cross-section remains substantially the same without incisions or voids, which are hidden in the tread element such as teardrop sipes, being revealed as the tread element wears. This increased rigidity leads to increased stresses such as increased X and Y stresses, which when they are negative or braking, leads to abnormal wear. One way to improve this is to use a more hysteretic material, but as stated above, this can lead to other problems such as lost fuel economy and tread degradation.

Figure 6:
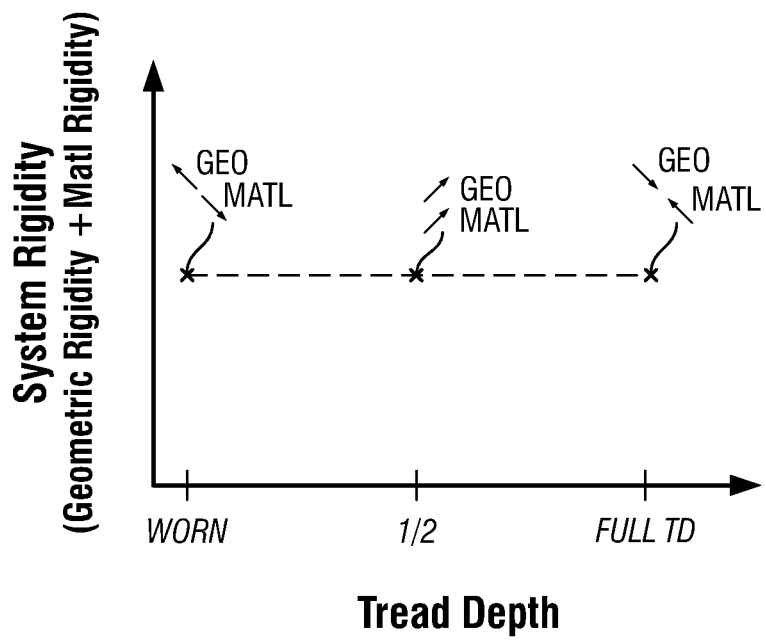
FIG. 6 is a graph depicting the that the desired system rigidity of a tread element, which is a function of the geometric rigidity and effective material modulus of a tread element, stays substantially the same as the tread element wears or may decrease slightly in order to improve abnormal wear.

Accordingly, the inventor has proposed to provide a tread or tread elements having a gradient of properties to maximize the benefits of having high and low hysteretic materials as well as high and low modulus materials in the tread. As shown in FIG. 6, it is beneficial to have a system rigidity in a tread or tread element, which remains relatively constant as the tread or tread element wears. This system rigidity comprises the geometric rigidity described above as wells as the modulus of the material or materials used in the tread or tread element. When the system rigidity remains relatively constant, the stresses experienced by the tread or tread element are not increased as the tread or tread element wears, helping to prevent the rise of X or Y stresses, which are contributors to the creation of abnormal wear. This constant system rigidity can be achieved, for example, by providing a gradient of the modulus of the material or materials used in the tread so that the increased geometric rigidity is offset by the increased softness of the material.

In other words, when the tread is unworn, its geometric rigidity is low so a higher material modulus is usually desirable, whereas when the tread is fully worn, the geometric rigidity is high and the desirable material modulus should be low in order to maintain the system rigidity of the tread during its life. Of course, a medium level of geometric rigidity and material modulus can be used in between the fully worn and unworn states.

Figure 7:
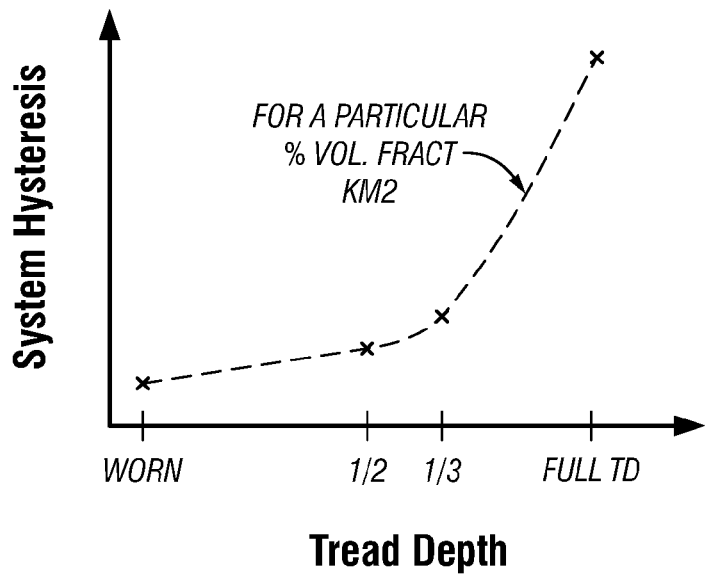
FIG. 7 is a graph showing that the system hysteresis preferably decreases as the tread element wears.

As shown by FIG. 7, it is desirable to have a gradient of hysteresis in the tread or tread element such that the hysteresis decreases over time as the tread wears. Thus, the hysteresis of the material should be greatest early in the life of the tire tread where irregular wear protection is most needed as the geometrical rigidity is commonly associated with unworn tread elements (this material is represented by KM2 in the figure), and least when the tread is fully worn. This maximizes the benefit for preventing abnormal wear when it is most likely and minimizes the penalty of higher rolling resistance and increased temperature associated with materials having higher hysteresis. In practice, the hysteresis should significantly reduced by the time that ⅓ to ½ of the tread or tread element has worn away for reasons discussed later, knowing that the hysteresis will continually decrease as the tread wears.

Figure 8:
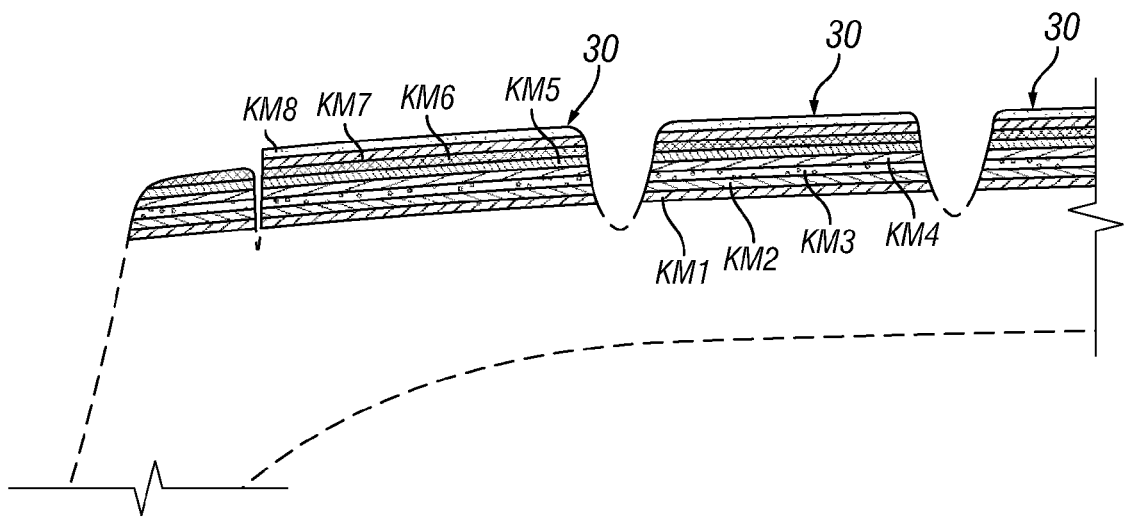
FIG. 8 shows multiple tread elements such as ribs that have multiple layers of tread rubber having different properties including a gradient of hysteresis according one embodiment of the present invention.

This gradient of properties can be achieved in different ways. One way is shown by FIG. 8 and includes the laying down of many different layers of materials having different hysteresis and modulus. For example, eight different layers could be provided (denoted by KM1 thru KM8 in the figure). The effective material property of any tread or tread element 30 using multiple layers of materials can be approximated by multiplying the property of a material used in a specific layer times the volume fraction that material constitutes of the whole for the tread or tread element and adding this weighted amount to similar weighted amounts of the other layers of the tread. These properties can be computed mathematically as follows:

$$V_{total} = V_{km1} + V_{km2} \text{(etc. for as many layers as are used)} \qquad \text{Eq. 7,}$$

where this equation calculates the total volume of the tread or tread element in terms of the volume of the first layer of tread material ($V_{km1}$) and volume of the second layer of tread material ($V_{km2}$), etc. It then follows that the system hysteresis can be computed as follows:

$$H_{sys} = (V_{km1}/V_{tot})H_{km1} + (V_{km2}/V_{tot})H_{km2} \text{(etc. for as many layers as are used)} \qquad \text{Eq. 8,}$$

where $H_{km1}$ is the hysteresis value of the first layer of material and $H_{km2}$ is the hysteresis value of the second layer of material, etc. In like fashion, the effective modulus for a tread element can be calculated as follows:

$$E_{sys} = (V_{km1}/V_{tot})E_{km1} + (V_{km2}/V_{tot})E_{km2} \text{(etc. for as many layers as are used)} \qquad \text{Eq. 9,}$$

where $E_{km1}$ is the modulus value of the first layer of material and $E_{km2}$ is the modulus value of the second layer of material, etc.

These multiple layers can be laid down manually or possibly coextruded. Ideally, the gradient of properties for both the system hysteresis and the system modulus would be completely continuous, as if the number of layers became infinite and their thickness approached zero. In such a case, the system hysteresis or system modulus could be calculated by integrating the values of these properties over the thickness of the tread element or tread. In either case, whether multiple layers are used or a continuous distribution of materials with varying properties is used, it is usually ideal if the gradient of properties is created with high hysteresis near the top layers of the tread element and a lower modulus near the bottom of the tread where the rigidity of the tread element tends to increase for reasons explained previously. The evolution of the properties of a tread element comprising multiple layers can be observed by periodically calculating the $V_{total}$, $H_{sys}$ and $E_{sys}$ based on the layers left on the tread element while the evolution of the properties of a tread element comprising a continuous distribution can be evaluated by periodically integrating the values of the properties as a function of the thickness of the tread element over the remaining thickness of the tread element. As can be seen, this proposed gradient of properties satisfies the desirable constant system rigidity and decreased system hysteresis depicted by FIGS. 6 and 7.

Figure 9:
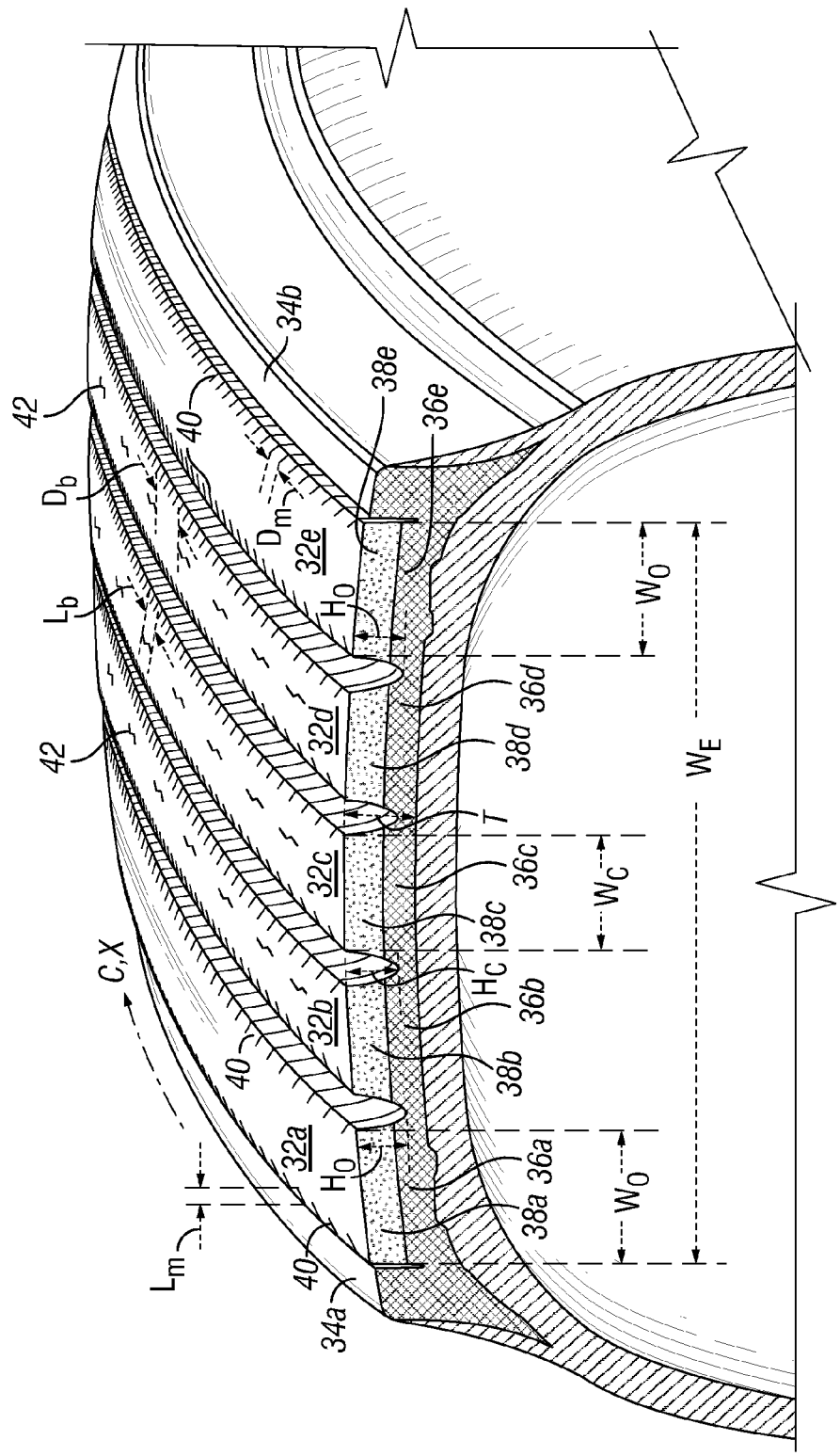
FIG. 9 illustrates an embodiment of the present invention that uses two layers of different materials in its tread.

In practice, it can be economically impractical to coextrude a large number of layers, such as the eight layers shown by FIG. 8, as well as technically challenging. Furthermore, the necessary gradient for each tire is somewhat dependent on the geometry of the sculpture of the tread, size of the tire, use of the tire and the associated force solicitation it puts on the tire, etc. As a result, less of a gradient is necessary for some tires than others. In such a situation, a tire with a tread only having two layers of materials having different properties may be necessary. Such a tire is shown by FIG. 9 and is a 275/80R22.5 or 275/80R24.5 sized tire. Alternatively, a tread used in the retreading process of a tire that has the same construction and properties as the treads of the aforementioned tires and that is a 11R22.5 or 11R24.5 sized tread can be used.

This tire comprises a tread having tread elements in the form of five main circumferential ribs 32 as well as two sacrificial ribs 34 found on each extremity of the tread (see FIG. 9). Each main rib 32 has a lower layer 36 having a first material and an upper layer 38 having a second material. The dimensions of the two outer main ribs 32a, 32e are identical and include a width, $W_o$, of 37 mm and a height, $H_o$ that is the distance from the bottom of the groove to the top of the rib, of 14 mm. Each outer rib has a series of directionally oriented microsipes 40 along the side edges of the outer rib that extend to the bottom of the groove on either side of the outer rib.

The three central ribs 32b, 32c, 32d have identical dimensions as well. They have a width, $W_c$, of 30 mm and a height, $H_c$, of 14 mm. The central ribs also have directionally oriented microsipes 40 that extend along their side edges to the bottom of the groove on either side of the central rib. In addition, each central rib has a series of circumferentially extending sipes 42 that are centrally located in the central ribs and that are equidistantly spaced from each other. All of the microsipes 40 of all the main ribs 32 are circumferentially C aligned with each other and are spaced a distance, $D_m$, of 5.25 mm from each other and have a length $L_m$ of 4.5 mm. Similarly, all the blind sipes 42 of central ribs are circumferentially C aligned with each other and are spaced a distance, $D_b$, of 15.5 mm from each other and have a length, $L_b$, of 10 mm. The overall effective width of the tread across all of the main ribs, $W_E$, is 205 mm.

The material of the upper layer 38 has a hystereis that is greater than that of the material of the lower layer 36. Also, the modulus of the material of the lower layer 36 is only slightly less than the modulus of upper layer 38. The inventor found that the sipes in the ribs of this tire reduced the increase of the geometrical rigidity of the ribs as they wore, requiring only a slight reduction in the modulus of the lower material in order to keep the system rigidity of each rib relatively constant. Also, the change in geometric rigidity of a rib as it wears is much less than that of a tread block, requiring less of a change in material modulus. Table I below shows possible material properties for different versions of these tires and treads.

TABLE I

| Tread Layer | Material | Hysteresis (tan delta max at 80° C.) | Young's Modulus at 10% Strain |
|---|---|---|---|
| Bottom Layer | Mix #1 | .1 | 4.6 MPa |
| Bottom Layer | Mix #2 | .08 | 4.75 MPa |
| Upper Layer (road interface) | Mix #3 | .18 | 4.9 MPa |

Figure 10:
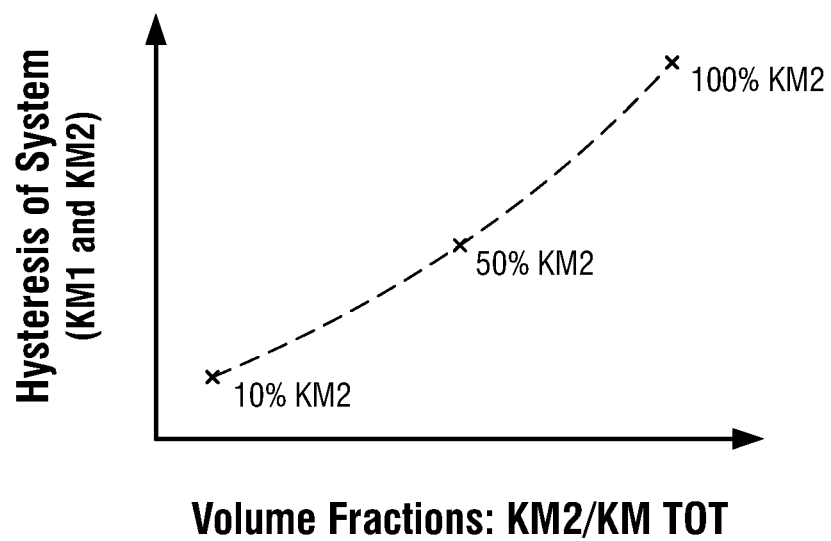
FIG. 10 is a graph showing the gradient of hysteresis of a tread element where the hysteresis decreases as the tread element wears according to an embodiment of the present invention shown in FIG. 9.

As stated previously, there also exists an optimum time when the protection from abnormal wear is most needed. This corresponds to the first ⅓ to ½ of the wearable life of the tread, which is usually equivalent to the first ⅓ to ½ of the thickness of the tread since the volume of the tread is relatively consistent in the circumferential direction of the tire. Accordingly, the inventor has proposed that the material most resistant to abnormal wear, which would correspond to mix #3 in table I, should be placed in this top ⅓ to ½ of the tread. Consequently, the upper layer of the tread usually constitutes approximately the top ⅓ to ½ of the thickness of the tread. For this particular embodiment, the thickness T of the tread is approximately 20.2 mm and the upper portion of the tread constitutes about 54% of the tread, which is slightly out of the typical range. This variance can be attributed to the high rigidity of the ribs, which allows the designer to use a higher hysteresis material with a lower modulus for a higher portion of the tread. FIG. 10 shows the evolution of the gradient of properties of a tread comprising two layers of materials as the tread wears until the top layer having the higher hysteresis is virtually gone.

As can be seen, this embodiment provides an optimized solution to the problem of abnormal wear by limiting the use of higher hysteresis material to where it is needed most. Also, it uses a relatively constant modulus of materials to help to maintain the system rigidity of its tread elements as they wear, which also helps to reduce the appearance of abnormal wear. The gradient of properties has lead to a breaking of the compromise usually associated between rolling resistance and abnormal wear, which is an unexpected and critical result. For steer truck tires that have a 275/80R22.5 size, a 15% increase in removal mileage has been observed which is truly significant.

While this invention has been described with reference to particular embodiments thereof, it shall be understood that such description is by way of illustration and not by way of limitation. For example, any number of material layers, properties of materials, geometrical shapes of tread elements, sizes of tires or treads for treading, etc. can be used as long as the necessary gradient of properties is provided to limit the development of abnormal wear. In addition, the suggested ranges and gradients of properties are to be considered design guidelines and one with ordinary skill in the art may make adjustments that fall outside of these guidelines for reasons set forth herein without departing from the spirit of the present invention. Accordingly, the scope and content of the invention are to be defined only by the terms of the appended claims.

What is claimed is:

1. A tire having a tread with tread elements, said tread having at least one element having a gradient of properties so that a system hysteresis of that tread element decreases as the tread element wears and a system rigidity of the tread element stays the same or decreases as the tread element wears, and wherein the gradient of properties includes a system hysteresis that is calculated using the formula $$H_{system}=(V_{km1}/V_{total})(H_{km1})+(V_{km2}/V_{total})(H_{km2})$$

as the tread wears where km2 is the top layer and km1 is the bottom layer.

2. The tire of claim 1 wherein all the tread elements have a gradient of properties so that an system hysteresis of each element decreases as tread clement wears and an effective rigidity of each tread element stays the same or decreases as the tread element wears.

3. The tire of claim 1 wherein the elements are ribs.

4. The tire of claim 1 wherein the gradient is continuous and the $H_{system}$ is calculated as an integral over the depth of the tread element.

5. The tire of claim 1 wherein the system rigidity is a function of the geometric rigidity of the tread element and a Young's modulus at 10% strain of one or more materials used in the tread element.

6. The tire of claim 5 wherein two materials are used in the tread element and the Young's modulus at 10% strain of the two materials is substantially the same.

7. The tire of claim 6, wherein the first material is used in the bottom layer of the tread element and has a Young's modulus at 10% strain of 4.6 to 4.75 MPa and the second material is used in the top layer of the tread element and has a Young's modulus at 10% strain of 4.9 MPa.

8. The tire of claim 7 wherein the hysteresis of the first material has a tan delta value at 80 C of 0.08 to 0.1 and the hysteresis of the second material has a tan delta value at 80 C of 0.18.

9. The tire of claim 6 wherein the top layer of the tread element comprises ⅓ to ½ of the thickness or wearable life of the tread element.

10. The tire of claim 5 wherein a single layer of material makes up the tread element that has a continuously varying Young's modulus at 10% strain.

11. A tire having a tread with tread elements, said tread having at least one element having a gradient of properties so that a system hysteresis of that tread element decreases as the tread element wears and a Young's modulus at 10% strain of the one or more materials that comprise the tread element stays essentially the same, and wherein the geometric rigidity of the tread element remains substantially the same as the tread element wears.

12. The tire of claim 11, wherein two materials comprise the tread element and the difference of the Young's modulus at 10% strain of one material to the other is less than 20%.

13. The tire of claim 12, wherein the hysteresis of the first material that comprise the lower layer of the tread element has a tan delta max at 80 C value of 0.08 to 0.01 and the hysteresis of the second material that comprises the tread element has a tan delta max at 80 C value of 0.18.

14. The tire of claim 13, wherein the Young's modulus at 10% strain of the first material is 4.6 to 4.75 MPa and the Young's modulus at 10% strain of the second material is 4.9 MPa.

15. The tire of claim 14, wherein the top layer of the tread element comprises ⅓ to ½ of the thickness or wearable life of the tread.

\* \* \* \* \*